UNITED STATES PATENT OFFICE.

THEODORE SCHMIDTBORN, OF JERSEY CITY, NEW JERSEY, ASSIGNOR TO HIMSELF, AND HUGO H. HARNISH, OF NEW YORK, N. Y.

PROCESS OF MAKING AMMONIUM CHLORIDE.

SPECIFICATION forming part of Letters Patent No. 330,155, dated November 10, 1885.

Application filed March 27, 1885. Serial No. 160,295. (No specimens.)

*To all whom it may concern:*

Be it known that I, THEODORE SCHMIDTBORN, a citizen of Germany, residing at Jersey City, in the county of Hudson and State of New Jersey, have invented new and useful Improvements in the Manufacture of Chloride of Ammonium and Sulphate of Potash, of which the following is a specification.

This invention relates to a new process of manufacturing ammonium chloride and potassium sulphate by the reaction of ammonium sulphate upon potassium chloride.

In carrying out my invention I take ammonium sulphate and bring it together with potassium chloride in the proportion of their equivalents according to the following formula: $(NH_4)_2SO_4 + 2KCl = K_2SO_4 + 2NH_4Cl$.

The conversion can be effected by bringing together saturated solutions of the two salts, or by introducing into a hot solution of ammonium sulphate a corresponding quantity of potassium chloride in a solid condition, or by introducing into a solution of potassium chloride a corresponding quantity of ammonium sulphate in a solid condition. The conversion can also be effected by treating a mixture of ammonium sulphate and potassium chloride repeatedly with water. When the solution is permitted to cool to about 90° centigrade, the potassium sulphate precipitates in an amorphous state, and when the temperature comes down to about 70° needles begin to form in the liquid, which indicates that the ammonium chloride begins to crystallize. At this point the supernatant liquor, which contains the ammonium chloride, is poured or drawn off from the precipitated potassium sulphate, and speedy separation of the two salts is effected, which is very important in manufacturing them on a large scale in the manner above described.

In carrying out my invention on a larger scale a portion of the potassium sulphate is at once precipitated in solid state, if concentrated solutions of ammonium sulphate and of potassium chloride are brought together, or if potassium chloride is introduced, little by little, into a hot solution of ammonium sulphate.

The potassium sulphate is freed from the adhering liquor by centrifugal machine, and finally freed from adhering particles of ammonium chloride by a systematic treatment.

The mother-liquor which remains after the removal of the potassium sulphate contains, principally, ammonium chloride mixed with a small portion of potassium sulphate dissolved during the reaction. By evaporating this mother-liquor the largest portion of this potassium sulphate is precipitated and a hot saturated solution of ammonium chloride is obtained, which contains only very little potassium sulphate. If this solution is left to cool, the largest portion of the ammonium chloride contained therein precipitates in the form of crystals in a nearly pure condition. By recrystallization, or by treatment with water, perfectly pure ammonium chloride can be obtained. The potassium sulphate obtained by the evaporation of the mother-liquor can be freed from the ammonium chloride by boiling in water or by treatment with hot water. The mother-liquor which remains after the ammonium chloride has crystallized may be used in treating a fresh batch of ammonium sulphate and potassium chloride.

What I claim as new, and desire to secure by Letters Patent, is—

1. The within-described process of manufacturing ammonium chloride and potassium sulphate, which consists in bringing together saturated solutions of ammonium sulphate and potassium chloride at the ordinary temperature, and then separating the products of the reaction, substantially as described.

2. The within-described process of manufacturing ammonium chloride and potassium sulphate, which consists in bringing together ammonium sulphate and potassium chloride in the presence of water and heat, and then separating the products of the reaction, substantially as described.

3. The within-described process of manufacturing ammonium chloride and potassium sulphate, which consists in bringing together ammonium sulphate and potassium chloride in the presence of a sufficient quantity of water to form a solution, then heating the solution to about 150° centigrade for about an hour, then allowing the same to cool until needles begin to form therein, then removing the supernatant liquor from the precipitate, and finally evaporating the liquor for the purpose of obtaining the ammonium chloride while the precipitate is freed from the adhering liquor, substantially as described.

In testimony whereof I have hereunto set my hand and seal in the presence of two subscribing witnesses.

THEODORE SCHMIDTBORN. [L. S.]

Witnesses:
 W. HAUFF,
 E. F. KASTENHUBER.